(12) United States Patent
Bird (10) Patent No.: US 9,358,631 B2
(45) Date of Patent: Jun. 7, 2016

(54) COARSE HARD-METAL PARTICLE INTERNAL INJECTION TORCH AND ASSOCIATED COMPOSITIONS, SYSTEMS, AND METHODS

(75) Inventor: Jay Stuart Bird, The Woodlands, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 334 days.

(21) Appl. No.: 14/110,729

(22) PCT Filed: Jun. 15, 2011

(86) PCT No.: PCT/US2011/040448
§ 371 (c)(1),
(2), (4) Date: Oct. 9, 2013

(87) PCT Pub. No.: WO2012/173611
PCT Pub. Date: Dec. 20, 2012

(65) Prior Publication Data
US 2014/0054027 A1    Feb. 27, 2014

(51) Int. Cl.
*B23K 9/04*      (2006.01)
*B23K 10/02*     (2006.01)
*H05H 1/42*      (2006.01)
*E21B 10/46*     (2006.01)
*E21B 41/00*     (2006.01)

(52) U.S. Cl.
CPC ............... *B23K 10/02* (2013.01); *E21B 10/46* (2013.01); *E21B 41/00* (2013.01); *H05H 1/42* (2013.01)

(58) Field of Classification Search
CPC ........ B23K 9/042; B23K 9/044; B23K 10/35; H05H 1/42
USPC ............... 219/121.48, 121.5, 121.36, 76.16; 427/455, 456; 166/902; 118/723 R
See application file for complete search history.

(56) References Cited

U.S. PATENT DOCUMENTS

| 3,839,618 | A | * | 10/1974 | Muehlberger | B05B 7/168 219/121.47 |
| 4,127,760 | A |   | 11/1978 | Meyer et al. | |
| 4,837,417 | A | * | 6/1989  | Funk | B23K 9/04 219/76.12 |
| 4,938,991 | A |   | 7/1990  | Bird | |
| 6,124,564 | A | * | 9/2000  | Sue | B23K 9/287 175/327 |
| 6,137,078 | A |   | 10/2000 | Keller | |
| 7,892,652 | B2| * | 2/2011  | Strock | C23C 4/04 106/1.05 |

(Continued)

FOREIGN PATENT DOCUMENTS

CN    101163849 A    4/2008
WO    2012173611 A1  12/2012

OTHER PUBLICATIONS

Supplementary European Search Report for EP 11 86 7947 dated Oct. 3, 2014.

(Continued)

*Primary Examiner* — Kenneth L Thompson
(74) *Attorney, Agent, or Firm* — McDermott Will & Emery LLP; Alan Bryson (57) ABSTRACT

Internal coarse particle injection plasma transferred arc torch nozzles comprising: a heat-resistant nozzle body; at least one coarse hard-metal particle internal injection port; at least one fine hard-metal particle and matrix internal injection port; at least one gas port; and a cathode. Related systems, apparatus, compositions, and methods involving such arc torch nozzles are also disclosed.

20 Claims, 7 Drawing Sheets

(56) References Cited

U.S. PATENT DOCUMENTS

| | | | |
|---|---|---|---|
| 7,955,706 B1* | 6/2011 | Withers | B22F 3/105 |
| | | | 428/212 |
| 8,322,466 B2* | 12/2012 | Bird | B22F 7/062 |
| | | | 175/374 |
| 8,471,182 B2* | 6/2013 | Stauffer | B23K 9/044 |
| | | | 219/121.59 |
| 8,679,207 B2* | 3/2014 | Amano | B23K 9/04 |
| | | | 428/148 |
| 2006/0207803 A1 | 9/2006 | Overstreet | |
| 2007/0011873 A1* | 1/2007 | Teale | B23K 9/0026 |
| | | | 29/889.23 |
| 2008/0000881 A1* | 1/2008 | Storm | C23C 8/24 |
| | | | 219/121.47 |
| 2010/0101866 A1 | 4/2010 | Bird | |
| 2010/0159157 A1 | 6/2010 | Stevens et al. | |
| 2010/0189910 A1* | 7/2010 | Belashchenko | B22F 1/0096 |
| | | | 427/451 |
| 2010/0276397 A1* | 11/2010 | Luce | B23K 9/167 |
| | | | 219/74 |
| 2011/0189466 A1* | 8/2011 | Jaggi | C23C 4/06 |
| | | | 428/304.4 |

OTHER PUBLICATIONS

International Search Report and Written Opinion for PCT/US2011/040448 dated Oct. 18, 2011.
Official Action for Chinese Application No. 201180071646.3 dated Jun. 23, 2015.

* cited by examiner

COARSE HARD-METAL PARTICLE INTERNAL INJECTION TORCH AND ASSOCIATED COMPOSITIONS, SYSTEMS, AND METHODS

BACKGROUND

The present invention relates to the hardfacing of downhole tools with hard-metal powders and, more particularly, to plasma transferred arc torch systems for the internal injection of coarse hard-metal particles for hardfacing downhole tools.

"Hardfacing," as that term is used herein, may be generally defined as a layer of hard, abrasion resistant material (referred to herein as a "deposit") applied to a less resistant surface or substrate by a deposition technique. Hardfacing is frequently used to extend the service life of drill bits and other downhole tools used in the oil and gas industry. Tungsten carbide and various alloys of tungsten carbide are examples of hardfacing materials widely used to protect drill bits and other downhole tools associated with drilling and producing oil and gas wells. In effect, the carbide particles are suspended in a matrix of metal forming a layer on the surface of the tool. The carbide particles give the hardfacing material hardness and wear resistance, while the matrix metal provides fracture toughness to the hardfacing. The use of this technique has increased significantly over the years as industry has come to recognize that substrates of softer, lower, cost material can be hardfaced to have the same wear and corrosion resistance characteristics as more expensive substrates of a harder material.

Coating/hardfacing procedures consist of producing relatively thick deposits on substrates in order to give the latter the qualities inherent in the deposited material. Hardfacing involves the deposition of a hard layer by welding or thermal spraying. Conventional weld hardfacing is accomplished by oxyfuel welding ("OFW"), gas tungsten arc welding ("TIG"), gas metal arc welding ("GMAW"), shielded metal arc welding ("SMAW"), submerged arc welding ("SAW"), and flux-cored arc welding ("FCAW"). Plasma transferred arc hardfacing and laser beam hardfacing can also be used. Typically, a hardfacing material is applied, such as by arc or gas welding, to the exterior surface of a downhole tool, such as a drill bit, to protect the bit against erosion and abrasion. The hardfacing material typically includes one or more metal carbides, which are bonded to the steel body by a metal alloy ("binder alloy").

Many factors affect the durability of a hardfacing composition in a particular application. These factors include the chemical composition and physical structure (size, shape, and particle size distribution) of the carbide particles, the chemical composition and microstructure of the matrix metal or alloy, and the relative proportions of the carbide materials to one another and to the matrix metal or alloy. The metal carbide most commonly used in hardfacing is tungsten carbide. Small amounts of tantalum carbide and titanium carbide may also be present in such material, although these other carbides may be considered to be deleterious.

Regardless of the type of hardfacing material used, designers continue to seek improved properties (such as improved wear resistance, thermal resistance, etc.) in the hardfacing materials. Unfortunately, increasing wear resistance usually results in a loss in fracture toughness, or vice-versa. For example, to achieve higher wear resistance (mainly against abrasion or erosion), the hardfacing composition may be designed to have a maximum amount of carbide content in the metallic matrix or the thickness of the hardfacing layer may be increased. However, a hardfacing with higher hardness and higher carbide content is more prone to cracking and delamination, especially as the thickness of the hardfacing increases. Furthermore, the tenacity or fracture toughness of a hardfacing layer decreases with an increased thickness of the single hardfacing layer, limiting the life of the hardfacing. One way to achieve a balance in abrasion or erosion resistance and toughness is to include larger carbide particles in the hardfacing composition. Larger particles have a larger surface area in the weld deposit that provides for enhanced mechanical properties.

Figure 1:
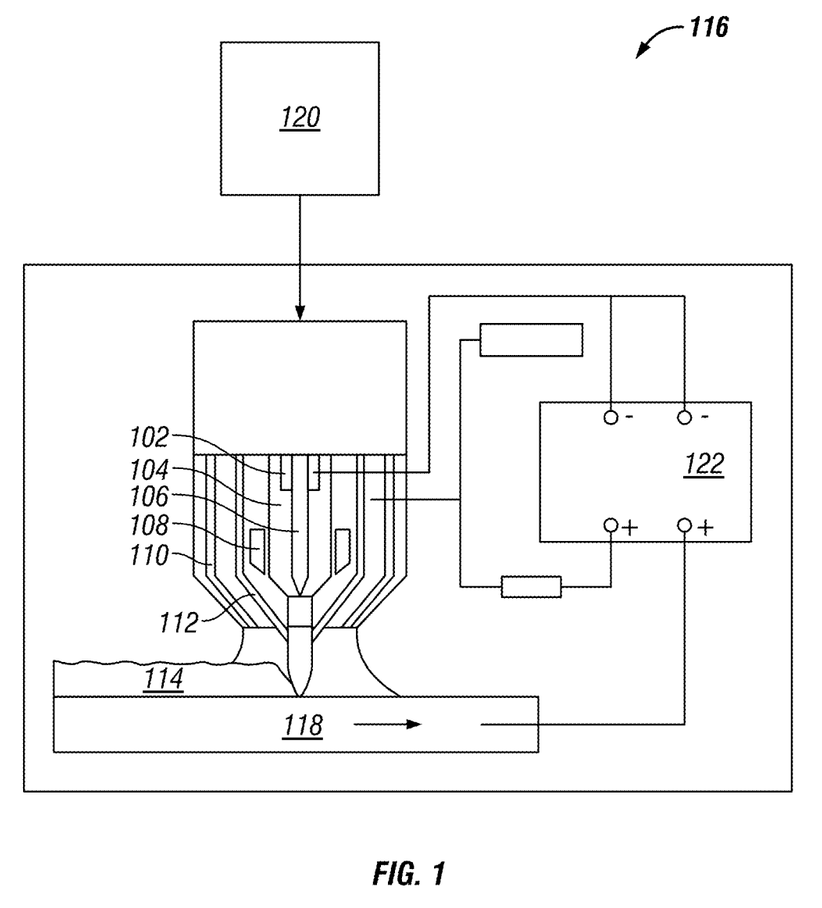
FIG. 1 is a cross-sectional diagram of a PTA nozzle assembly.

When use is made of the plasma transferred arc (PTA) method, the transferred arc constitutes the heating element of the recharging material and the surface of the part forming the substrate. Referring to FIG. 1, a cross-sectional illustration of a PTA torch nozzle 116, a PTA torch nozzle has cathode holding device 102, plasma gas 104, cathode 106, cooling water 108, shielding gas 110, feedline 112 for the carbide powder from carbide powder hopper 120, weld deposit 114, substrate 118 (e.g., portion of a downhole tool that is being hardfaced), and power supply 122.

In a typical PTA device such as that shown in FIG. 1, the substrate is raised to a positive potential compared with the cathode of the torch and the plasma jet is then entirely traversed by electric current between the torch and the substrate, transmitting to the latter the energy necessary for heating and localized melting of the zone to be coated or hardfaced. The carbide powder is melted on the surface of the part in order to form a liquid weld deposit, which is continuously renewed during the displacement of the part beneath the torch. The surface melting of the substrate permits a metallurgical bond similar to that encountered in welding processes.

Although PTA methods are very useful in hardfacing techniques, the carbide powders that can be employed in those methods are limited in terms of particle sizes that can be used within the PTA nozzles. Normal torches feed fine carbide powders, which when placed on the substrate, are not as wear resistant and erosion resistant. The typical particle sizes that can be accommodated by PTA nozzles are about 250 microns to about 38 microns (60 mesh or finer). This is due to the clogging problems that results in the feedlines and in the nozzle of the PTA if larger particles are utilized in the carbide powder. Thus, heretofore, to utilize larger grain sizes of carbide particles, it is necessary to apply the carbide powder to the substrate with a manual welding technique utilizing carbide ropes or rods.

Manual application of the carbide powder can result in several issues due to human error and the inherent variability in a manual process. In terms of variability, the thickness of the weld deposit can vary greatly when applied manually. This may lead to additional techniques such as grinding with diamond grinding wheels of the coating to provide the desired thickness. Additionally, in a manual welding process, the substrate has to be pre-heated (e.g., to about 700° F., which requires additional time and exposes operators to high heats. Manual processes are also slower (e.g., at least three times) than automatic/robotic processes, which can lead to operator fatigue and accidents.

SUMMARY OF THE INVENTION

The present invention relates to the hardfacing of downhole tools with hard-metal powders and, more particularly, to plasma transferred arc torch systems for the internal injection of coarse hard-metal particles for hardfacing downhole tools.

In one embodiment, the present invention provides an internal coarse particle injection plasma transferred arc torch nozzle comprising: a heat-resistant nozzle body; at least one coarse hard-metal particle internal injection port; at least one fine hard-metal particle and matrix internal injection port; at least one gas port; and a cathode.

In one embodiment, the present invention provides a system for hardfacing a downhole tool comprising: a plasma transfer arc nozzle that comprises: a heat-resistant nozzle body, at least one coarse particle internal injection port, at least one fine hard-metal particle and matrix internal injection port, at least one gas port, and a cathode; and a coarse hard-metal particle hopper; a fine hard-metal particle and matrix hopper; a robotic arm; a manipulatable substrate support table; a power supply; and a computer control system.

In one embodiment, the present invention provides a downhole tool comprising: at least one surface of the downhole tool; a layer of hardfacing formed from a weld deposit on the surface of the downhole tool, the weld deposit being applied by an internal coarse particle injection plasma transferred arc torch nozzle, the weld deposit further having a plurality of coarse hard-metal particles hard-metal and a matrix dispersed within the weld deposit; wherein at least one of the coarse hard-metal particles has a size range of about 2000 microns to about 250 microns (10 mesh to 60 mesh).

In one embodiment, the present invention provides a method of hardfacing a surface of a downhole tool, the method comprising: placing a weld deposit on the surface of the downhole tool with a robotic hardfacing system comprising an internal coarse particle injection plasma transferred arc torch nozzle that comprises: a heat-resistant nozzle body; at least one coarse hard-metal particle internal injection port; at least one fine hard-metal particle and matrix internal injection port; at least one gas port; and a cathode; and the weld deposit comprising a uniform distribution of large carbide particles.

In one embodiment, the present invention provides a method comprising: providing a downhole tool that comprises a surface that has a hardfacing, the hardfacing being formed by an internal coarse particle injection plasma transferred arc torch nozzle that comprises: a heat-resistant nozzle body; at least one coarse hard-metal particle internal injection port; at least one fine hard-metal particle and matrix internal injection port; at least one gas port; and a cathode; and placing the downhole tool in a subterranean formation.

The features and advantages of the present invention will be readily apparent to those skilled in the art upon a reading of the description of the preferred embodiments that follows.

BRIEF DESCRIPTION OF THE DRAWINGS

The following figures are included to illustrate certain aspects of the present invention, and should not be viewed as exclusive embodiments. The subject matter disclosed is capable of considerable modification, alteration, and equivalents in form and function, as will occur to those skilled in the art and having the benefit of this disclosure.

DETAILED DESCRIPTION

The present invention relates to the hardfacing of downhole tools with hard-metal powders and, more particularly, to plasma transferred arc torch systems for the internal injection of coarse hard-metal particles for hardfacing downhole tools.

The present invention provides internal coarse hard-metal particle injection plasma torch nozzles, systems for hardfacing downhole tools, downhole tools that comprise a surface that has been hardfaced with an internal coarse hard-metal particle injection plasma torch nozzle and/or system of the present invention, methods of hardfacing a surface of downhole tools, and methods of using downhole tools that comprise a surface that has been hardfaced with an internal coarse hard-metal particle injection plasma torch nozzle and/or system of the present invention.

Figure 6A:
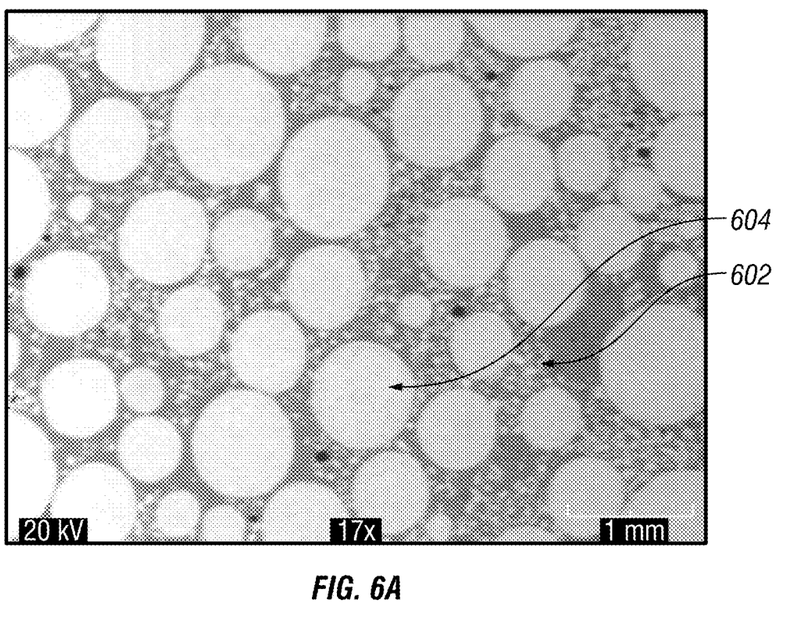
FIG. 6A depicts a cross-section of a deposit on a surface of a downhole tool made by a manual technique.
Figure 6B:
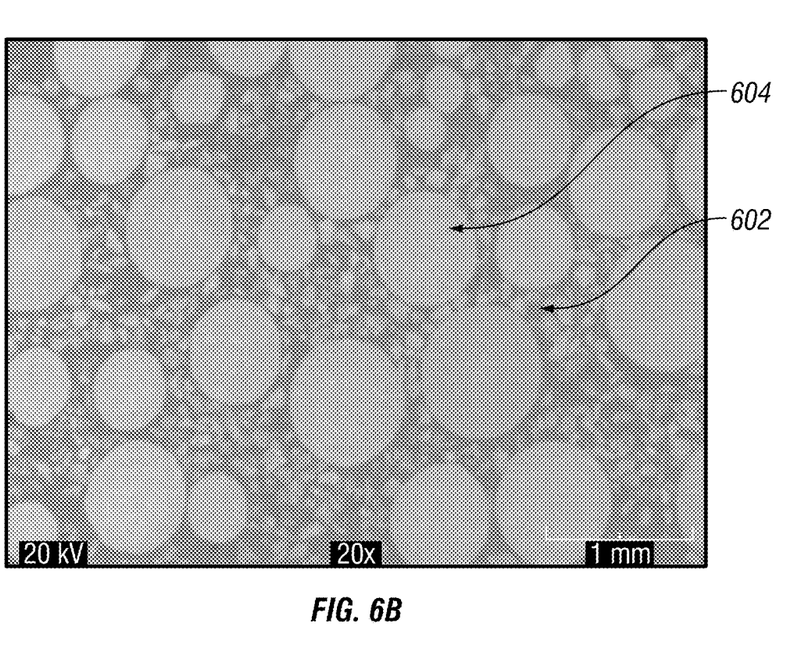
FIG. 6B depicts a cross-section of a deposit on a surface of a downhole tool made by an internal coarse hard-metal particle injection plasma transferred arc torch nozzle according to the present invention.

The present invention provides coarse hard-metal particle internal injection systems and methods for the improved hardfacing of downhole tools with powders having larger particles. Thus, the present invention provides downhole tools having improved erosion resistance, abrasion resistance, and wear resistance leading to longer tool life. For example, if the cutting surfaces of the drill bit are hardfaced according to the present invention, improved cutting downhole results. The powder compositions of the present invention provide for more consistent weld deposits, which lead to these improved characteristics. Moreover, the quality of the weld deposits is at least equal to that of a manual welding technique. Because the weld deposits are more uniform, an additional grinding step may be avoided. FIG. 6A is a cross-section micrograph of a weld deposit showing the incorporation of coarse hard-metal particles 604 in the weld deposit using a manual technique involving a welding rope. Shown at 602 are fine hard-metal particles in the matrix. FIG. 6B is a cross-section micrograph of a weld deposit showing the incorporation of coarse hard-metal particles 604 in the weld deposit using an internal coarse hard-metal particle injection plasma torch of the present invention. The hard-metal particle distribution within the matrix is similar to that obtained with a manual application. Thus, similar results can be achieved with the advantages of automation.

Furthermore, the PTA robotic hardfacing systems of the present invention are readily automated and excellent for series production. The automated processes of the present invention provide improved ergonomic and production advantages over conventional manual welding techniques.

Additionally, the substrates need not be preheated, which provides additional advantages in terms of energy conservation and hazard reduction. This results in shorter cycle times, and the capability for large scale production, which does currently not exist with manual techniques.

In sum, the ability to effectively inject coarse hard-metal particles that are highly wear and erosion resistant into a hard-metal coating using an automatic weld system creates a high quality production while significantly increasing product flow.

The term "internal coarse hard-metal particle injection plasma torch nozzle" as used herein refers to a plasma torch nozzle that comprises a coarse hard-metal particle injection port internal to the nozzle, meaning that coarse hard-metal particles may travel through the heat resistant nozzle body for deposition in the weld deposit as opposed to being externally injected into a weld deposit from a feed line and injection port external to the heat resistant nozzle body. Internal injection is advantageous as compared to an external feed because it actually puts the coarse hard-metal particles directly into the flame. In an external injection system, the coarse hard-metal injection port is not close enough to the arc to create this effect. Having the coarse hard-metal particles directly in the flame allows for more uniform application, resulting in fewer successive steps.

Having internal injection ports allows for a surprising result in that the coarse hard-metal particles providing enhanced mechanical properties can be uniformly incorporated within a weld deposit. Conventional nozzles do not allow for the use of coarse hard-metal particles, and doing so can lead to, among other things, inconsistent weld deposits and clogging of the injection ports.

Preferably, the methods of the present invention may be used to apply a hardfacing overlay to downhole tools. The term "downhole tool" as used herein is used to describe any metal tool or metal component of a tool that may be used in a subterranean application for which it is desirable to hardface a surface of the tool. Methods of hardfacing include employing equipment to produce an arc that heats a powder blend, e.g., a hardfacing powder, at temperatures above 14,000° F. The powder blend melts to form a molten alloy that is deposited onto a substrate, e.g., tool surface, to be overlayed. The molten alloy forms a weld deposit (also known as a pool or puddle) on the substrate, which is of a sufficiently high temperature to metallurgically bond or weld to the metal of the substrate and thereafter solidifies to form the hardfacing overlay. The thickness of a hardfacing overlay can be varied by controlling the amount of hardfacing powder supplied to the welder and the volume per time of deposition. Alternatively, the thickness of the facing can be increased by building up multiple layers, each of which welds to the previous layer.

It should be noted that when "about" is provided at the beginning of a numerical list, "about" modifies each number of the numerical list. It should be noted that in some numerical listings of ranges, some lower limits listed may be greater than some upper limits listed. One skilled in the art will recognize that the selected subset will require the selection of an upper limit in excess of the selected lower limit.

The powder compositions that are useful in the present invention comprise coarse hard-metal particles, fine hard-metal particles, and matrix materials. In some embodiments, the powder compositions used in the present invention may comprise coarse hard-metal particles and fine hard-metal particles combined in an amount ranging from about 55% to about 80% by weight of the powder composition. In some embodiments, the amount may be in the range of about 65% to about 70%. The remainder of the powder composition may comprise matrix materials.

It should be understood that the term "particulate" or "particle," as used in this disclosure, includes all known shapes of materials, including substantially spherical materials, fibrous materials, high-to-low aspect ratio materials, polygonal materials (such as cubic materials), and mixtures thereof. In preferred embodiments, the coarse hard-metal particles are highly spherical as they are believed to feed through torch better. The fine hard-metal particles may be angular in nature.

FIGS. 6A and 6B illustrate spherical coarse hard-metal particles 604 and angular fine hard-metal particles 602.

The term "coarse hard-metal particle" as used herein refers to hard-metal particles with a mean diameter greater than about 250 microns including, but not limited to, particles with a mean diameter ranging in size from a lower limit of about 250 microns, 500 microns, 750 microns, and 1000 microns to an upper limit of about 750 microns, 1000 microns, 1500 microns, and 2000 microns, and wherein the mean diameter may range from any lower limit to any upper limit and encompass any subset between the upper and lower limits. In some embodiments, the coarse hard-metal particles may have a diameter of about 1700 microns (12 mesh) to about 250 microns (60 mesh). In some embodiments, the coarse hard-metal particles may have a diameter of about 2000 microns (10 mesh) to about 250 microns (60 mesh). This terminology relates to the passing of the particles through mesh screens as known to one skilled in the art.

The term "fine hard-metal particle" as used herein refers to hard-metal particles with a mean diameter less than about 250 microns including, but not limited to, particles with a mean diameter ranging in size from a lower limit of about 10 microns, 50 microns, 75 microns, and 100 microns to an upper limit of about 75 microns, 100 microns, 150 microns, 200 microns, and 250 microns, and wherein the mean diameter may range from any lower limit to any upper limit and encompass any subset between the upper and lower limits. In some embodiments, the fine hard-metal particles may have a diameter of about 250 microns (60 mesh) to about 10 microns (1250 mesh).

In some embodiments, the coarse hard-metal particle may have a specific gravity ranging from about 14 g/cc to about 16 g/cc.

In some embodiments, the coarse hard-metal particle may have a hardness of about 1200 to about 2500 Knoop 1 kg load. In some embodiments, the fine hard-metal particle may have a hardness of about 1200 to about 2500 Knoop 1 kg load.

In some preferred embodiments, the coarse hard-metal particles have a hardness of about 1300 Knoop 1 kg load, a mean diameter of about 1180/600 microns, and a specific gravity of about 14 g/cc to about 16 g/cc.

In some preferred embodiments, the fine hard-metal particles have a hardness of about 1200 to about 2500 Knoop 1 kg load, a mean diameter of about 105/45 microns, and a specific gravity of about 14 g/cc to about 16 g/cc.

In a preferred embodiment, the fine hard-metal particles have a mean diameter of about 250 microns (60 mesh).

The coarse hard-metal particles and the fine hard-metal particles may comprise any suitable hard-metal that is capable of being used in a hardfacing application including, but not limited to, metal borides, metal carbides, metal oxides, metal nitrides, and combinations thereof. Examples include tungsten, cast tungsten carbides, carburized tungsten carbides, macro-crystalline tungsten carbides, cemented tungsten carbide (also known as sintered tungsten carbide), tungsten nitrides, tungsten silicides, tungsten borides, combinations thereof, and derivatives thereof. Other examples include carbon, niobium, vanadium, molybdenum, silicon, titanium, tantalum, yttrium, zirconium, chromium, boron, borides, carbides thereof, nitrides thereof, silicides thereof, mixtures thereof, combinations thereof, and mixtures thereof. Tungsten carbide may be preferred for use in the present invention.

The term "tungsten carbide," as used herein, may include monotungsten carbide (WC), ditungsten carbide ($W_2C$), and/or macrocrystalline tungsten carbide. Cast carbide refers to a eutectic mixture of the WC and $W_2C$ compounds, and as such is substoichiometric; that is, it has less carbon than the WC form. Cast carbide is solidified from the molten state and comminuted to the desired particle size. Suitable tungsten carbide particles may have no binding material (0% by weight of binding material) or with relative high percentages (5% or greater) by weight of binding material in such tungsten carbide particles. Examples of binding materials used to form tungsten carbide particles may include, but are not limited to, cobalt, nickel, boron, molybdenum, niobium, chromium, iron, and alloys of these elements. A preferred type of coarse hard-metal particle that is suitable for use in the present invention is a tungsten carbide pellet that comprises about 4% cobalt binder. Suitable coarse hard-metal particles are described in U.S. Patent Pub. No. 2010/0101866, published Apr. 29, 2010, the entire disclosure of which is hereby incorporated by reference.

Also suitable is cemented tungsten carbide. Cemented tungsten carbide refers to a material formed by mixing particles of tungsten carbide, typically monotungsten carbide, and particles of cobalt or other iron group metal, and sintering the mixture. In a typical process for making cemented tungsten carbide, small tungsten carbide particles, e.g., about 1 to about 15 microns, and cobalt particles are vigorously mixed with a small amount of organic wax which serves as a temporary binder. An organic solvent may be used to promote uniform mixing. The mixture may be prepared for sintering by either of two techniques: it may be pressed into solid bodies often referred to as green compacts; alternatively, it may be formed into granules or particles such as by pressing through a screen, or tumbling and then screened to obtain more or less uniform particle size.

In one embodiment, the coarse hard-metal particles comprise tungsten carbide pellets intermixed with a plurality of coated diamond particles as described in U.S. Patent Pub. No. 2010/0101866, published Apr. 29, 2010, the entire disclosure of which is hereby incorporated by reference.

In one embodiment, the coarse hard-metal particles comprise about 3.5% to about 5% cobalt, about 5.65% to about 5.85% carbon, about 0.5% iron, about 0.3% titanium, about 0.3% tantalum, with the balance comprising tungsten. In one embodiment, the fine hard-metal particles may comprise about 6% carbon, about 0.5% iron, about 0.3% titanium, about 0.3% tantalum, with the balance being tungsten.

The matrix materials in the compositions used in the present invention may comprise any suitable matrix material for hardfacing applications. Examples of suitable components for the matrix include, but are not limited to, chromium, iron, silicon, boron, carbon, cobalt, nickel, and combinations and mixtures thereof.

In an example of an embodiment, a matrix may comprise about 7% to about 8% chromium, about 1.5% to about 3.5% iron, about 3.2% to about 3.8% silicon, about 1.5% to about 1.8% boron, about 0.2% to about 0.3% carbon, 0.1% cobalt, with the balance being nickel.

In some embodiments, the matrix material may be provided in particulate form wherein the matrix particulates (not including the fine hard-metal particulates) may have a hardness of about 350 to about 420 HV30. Note these units refer to a different testing technique for hardness. The size ranges of these particles in the matrix, in some embodiments, is about 125 microns or less. The specific gravity is about 8 g/cc and the melting point is about 1888 to about 1940° F. These are measurements before or upon mixing a powder composition.

In some embodiments, the present invention provides internal coarse particle injection plasma transferred arc torch nozzles that comprise: a heat-resistant nozzle body; at least one coarse hard-metal particle internal injection port; at least one fine hard-metal particle and matrix internal injection port; at least one gas port; and a cathode.

Figure 2:
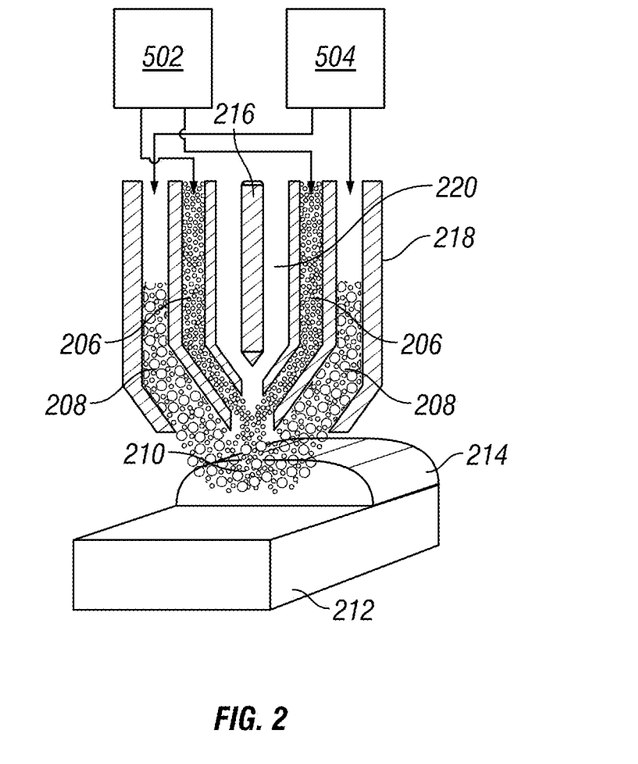
FIG. 2 is a schematic of a cross-section of an internal coarse hard-metal particle injection plasma transferred arc torch nozzle according to the present invention.

Referring now to FIG. 2, a schematic of non-limiting embodiment, a coarse hard-metal particle internal injection PTA nozzle of the present invention may have heat-resistant nozzle body 218, which may be made from any suitable heat-resistant material including, but not limited to, copper, titanium, and the like. First hopper 504 houses large carbide particles for the carbide powder composition to be fed through the coarse hard-metal particle internal injection port 208. A second hopper 502 houses the fine hard-metal particles and the matrix to be fed through the fine hard-metal and matrix internal injection port 206. Combined flow 210 of coarse hard-metal particles, fine particles, and matrix materials form weld deposit 214 on substrate 212. Gas may mix in coarse hard-metal particle internal injection port 208, fine hard-metal and matrix internal injection port 206, and/or in channel 220 surrounding cathode 216. In some embodiments, the coarse hard-metal particle internal injection port 208 and fine hard-metal and matrix internal injection port 206 may be reversed in configuration from that shown in FIG. 2. Suitable gases may be inert gases that may include, but are not limited to, argon, helium, nitrogen, xenon, carbon dioxide, and the like, and combinations thereof. The gas port need not be separate from these injection ports, but rather may allow the gas to mix with any components needed in the nozzle. Gases, however, preferably are used to feed the particles from the hoppers to the injection ports.

Figure 3:
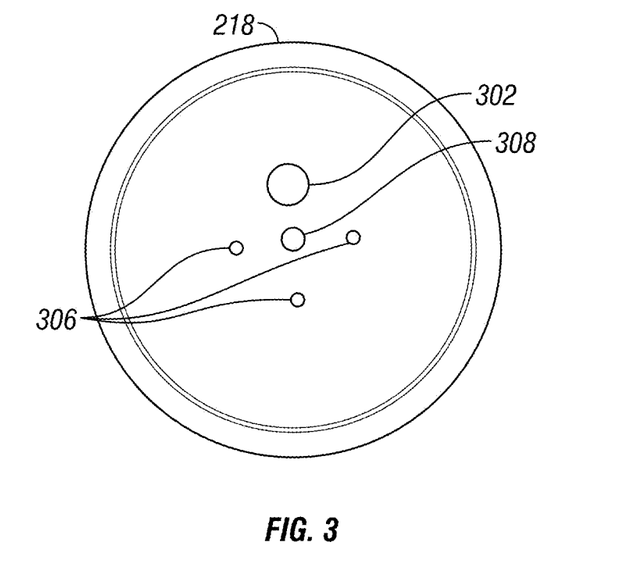
FIG. 3 is a schematic of a face of an internal coarse hard-metal particle injection plasma transferred arc torch nozzle according to the present invention.

Referring now to FIG. 3, a cross-sectional representation of a non-limiting embodiment, the face of a coarse hard-metal particle internal injection PTA nozzle may have a heat-resistant nozzle body 218. Coarse hard-metal particle internal injection port 302 is fed by a hopper that comprises the coarse hard-metal particles. This corresponds to a 208 in FIG. 2. It is referred to herein as an "internal injection port" because the coarse hard-metal particles travel through the heat resistant nozzle body for deposition in the weld deposit as opposed to be externally injected into a weld deposit from a feed line and injection port external to the heat resistant nozzle body. Depending on the volume of coarse hard-metal particles that are desired in the weld deposit, additional coarse hard-metal particle internal injection ports may be included in the design of the face of the PTA nozzle. Preferably, the feedlines for these injection ports are fed from a single coarse hard-metal particle hopper and a single fine hard-metal particle and matrix hopper. Fine hard-metal and matrix internal injection port 306 are similarly internal to the heat resistant nozzle body. This corresponds to a 206 in FIG. 2. Depending on the amount of fine hard-metal particles desired in the weld deposit, more or less fine hard-metal and matrix internal injection port 306 may be included than shown in FIG. 3. Arc port 308 is the arc port.

Figure 7:
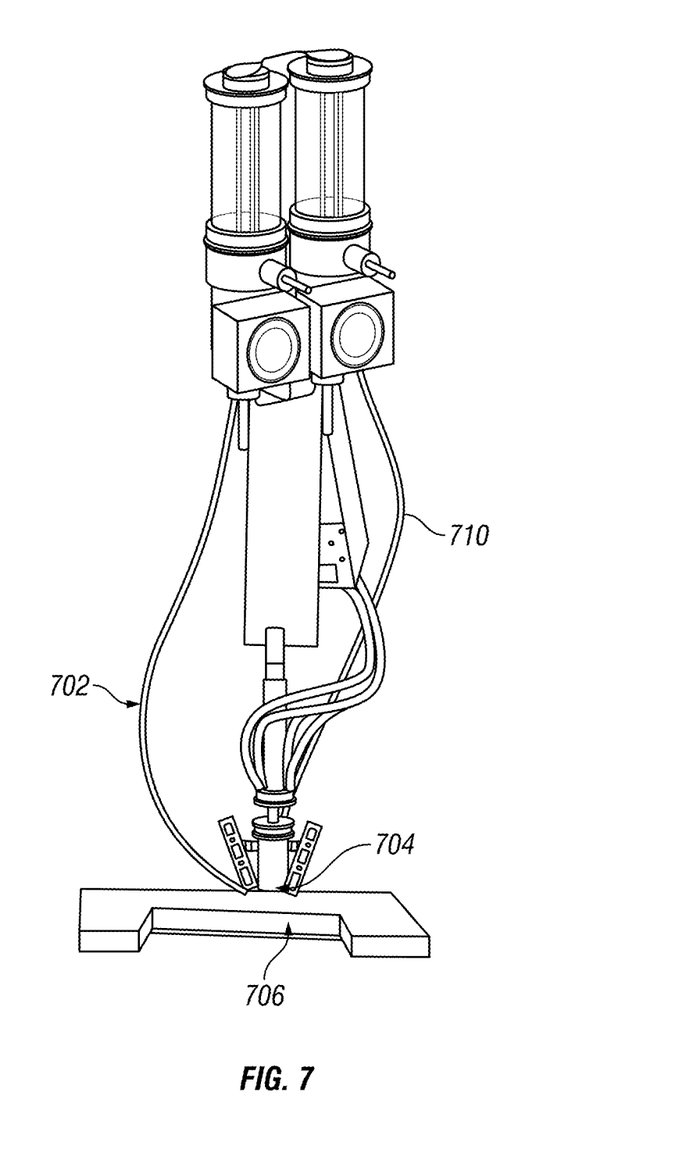
FIG. 7 depicts an external injection system for a coarse hard-metal particle plasma transferred arc torch.

For comparison to FIG. 3 internal injection port, FIG. 7 illustrates a prior art example of a PTA apparatus with an external mechanism for coarse hard-metal particle injection port 702, fine hard-metal and matrix injection port 710, hoppers 708, nozzle body 704, and substrate 706.

In one embodiment, the present invention provides an internal coarse particle injection plasma transferred arc torch nozzle comprising: a heat-resistant nozzle body; at least one coarse hard-metal particle internal injection port; at least one fine hard-metal particle and matrix internal injection port; at least one gas port; and a cathode.

The robotic coarse hard-metal particle internal injection systems of the present invention comprise a PTA nozzle that has at least one coarse hard-metal particle internal injection port, and at least one fine hard-metal particle and matrix internal injection port, a substrate support table, and a robotic arm.

In some embodiments, the present invention provides systems for hardfacing a downhole tool comprising: a plasma transfer arc nozzle that comprises: a heat-resistant nozzle body; at least one coarse particle internal injection port; at least one fine hard-metal particle and matrix internal injection port; at least one gas port; and a cathode; a first hopper for coarse hard-metal particles; a second hopper for fine hard-metal particles and the matrix powder; a robotic arm; a manipulatable substrate support table; a power supply; and a computer control system. In some embodiments, the computer control system is a CAM (computer aided manufacturing) system.

Figure 4:
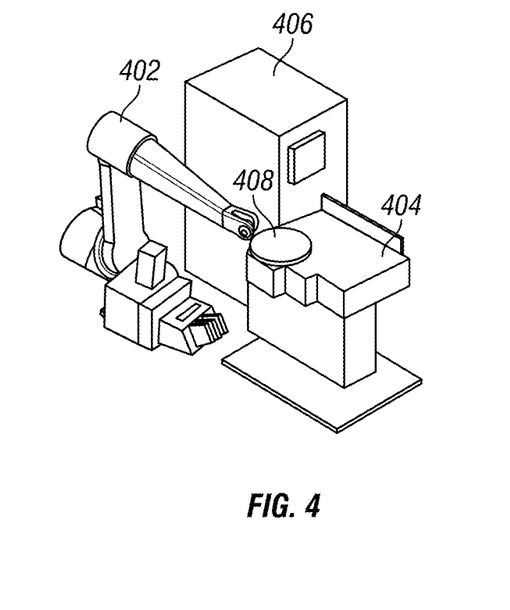
FIG. 4 is a depiction of a robotic hardfacing system of the present invention comprising an internal coarse hard-metal particle injection plasma transferred arc torch nozzle according to the present invention.

Referring now to FIG. 4, an illustration of a non-limiting embodiment of a system, robotic arm 402 can be controlled by a computer system (not shown) to operate a coarse hard-metal particle internal injection PTA nozzle of the present invention. In some embodiments, the computer control system is a CAM system. Robotic arm 402 should be configured such that it can manipulate the coarse hard-metal particle internal injection PTA nozzle. The computer system may include a computer aided system ("CAD") system (e.g., a 3D model) that accommodates weld programs. Substrate support table 404 supports the substrate to which the weld deposit is being applied. Optionally, substrate support table 404 may include turntable 408. Substrate support table 404 is preferably manipulatable, meaning it can tilt or move in any desired direction to place the substrate in the desired place for the hard-facing. Preferably, substrate support table 404 is programmable for use in conjunction with any computer control system. In some embodiments, substrate support table 404 can oscillate to move the substrate as needed. In some embodiments, the substrate is stationary, and the coarse hard-metal particle internal injection PTA nozzle is substantially perpendicular to the substrate being hardfaced. Further, the system may include power supply 406.

Figure 5:
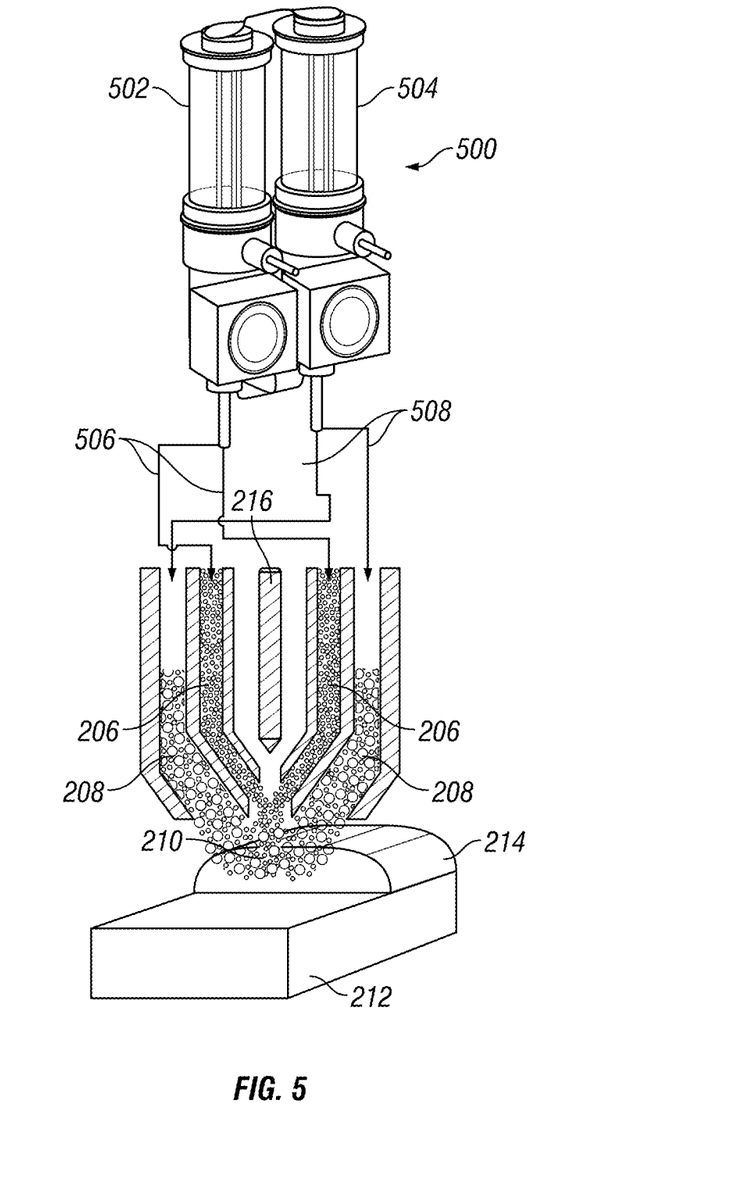
FIG. 5 is a depiction of a dual hopper system and an internal coarse hard-metal particle injection plasma transferred arc torch nozzle according to the present invention.

Referring now to FIG. 5, a non-limiting illustration of an embodiment, hopper system 500 may be used in conjunction with a coarse hard-metal particle internal injection PTA nozzle of the present invention. Coarse hard-metal particle hopper 502 houses a particle mixture comprising the coarse hard-metal particles. Hopper 504 is a fine particle hopper. Coarse hard-metal particle hopper 502 and fine particle hopper 504 connect to the nozzle through feedlines 506 and 508, respectively.

One skilled in the art with the benefit of this disclosure should understand that the system for hardfacing a downhole tool that employs the course hard-metal particle internal injection nozzle of the present invention may be configured to include other components and/or capabilities. Examples of these other components and/or capabilities include, but are not limited to, a cathode holding device, a plasma gas, a shielding gas, a coarse particle and fine particle feeding gas, a cooling system, a nozzle cooling system, and combinations thereof.

In one embodiment, the present invention provides a system for hardfacing a downhole tool comprising: a plasma transfer arc nozzle that comprises: a heat-resistant nozzle body, at least one coarse particle internal injection port, at least one fine hard-metal particle and matrix internal injection port, at least one gas port, and a cathode; and a coarse hard-metal particle hopper; a fine hard-metal particle and matrix hopper; a robotic arm; a manipulatable substrate support table; a power supply; and a computer control system.

In some embodiments, the thickness of the weld deposit may be 0.125" tolerance. If desired, a weld deposit can be ground down by any method known to one skilled in the art. However, this may not be necessary.

In the present invention, between the substrate and the weld deposit, preferably a metallurgical bond is produced.

Any downhole tool, or component thereof, that requires or benefits from hardfacing may be hardfaced according to the methods of the present invention including, but not limited to, drill bits, directional downhole tools, work over tools, completions and production equipment and the like, and other downhole tools which may or may not be used in the drilling of well bores. The term "downhole tool" as used herein is used broadly to describe tools placed in subterranean formations for drilling well bores into same. Specific examples include these tools or components thereof, but are not limited to, rotary cone drill bits, rotary steerable tools, mills (e.g., window cutting mills for reentry or multilateral wells, casing cutting mills, dressing mills, and the like), fixed cutter drill bits, coring bits, anti-rotation devices, underreamers, near bit reamers, hole openers, drive (mud) motors (e.g., formation contact points on these motors such as bent subs and stabilizers and the like), drive subs, downhole mandrels, stabilizers, tool joints, and centralizers. Other examples include downhole fluid separators, down hole pumps, work over equipment, and the like.

Figure 8:
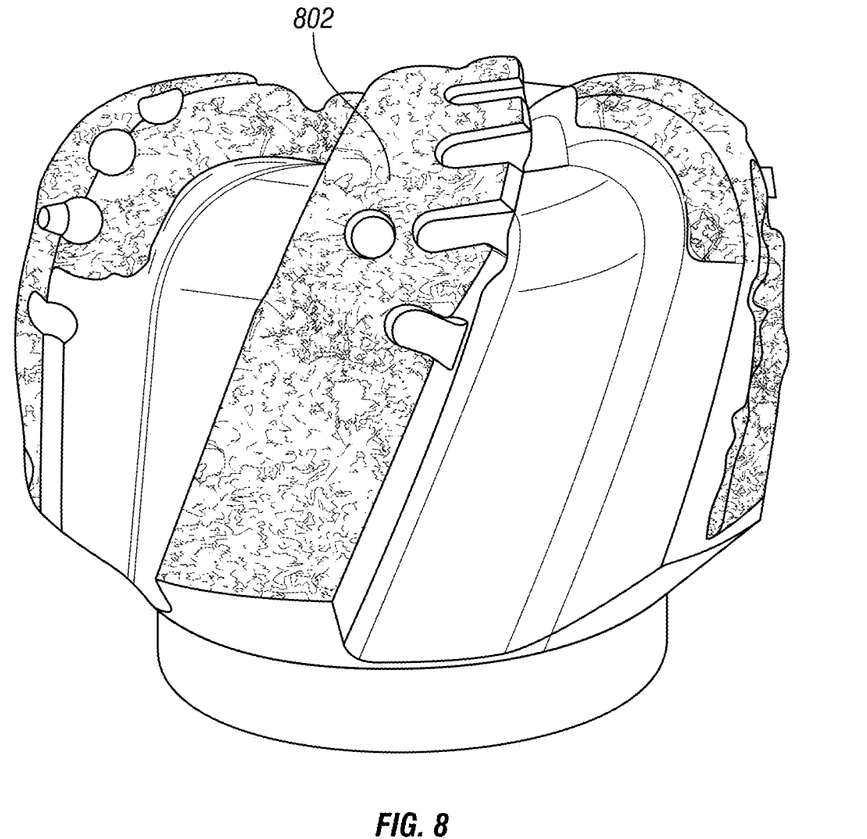
FIG. 8 depicts a downhole tool having a surface that has a hardfacing on the gage pads.

FIG. 8 depicts a downhole tool with a hardfacing 802. Other examples include, but are not limited to, coatings on rotors, radial bearings, flow restrictors, and universal couplings.

Downhole tools hardfaced by the present invention may be used in a variety of subterranean operations including, but not limited to, drilling operations, drill-in operations, completion operations, and remedial operations. In preferred embodiments, a hardfaced downhole tool may be used in a wellbore penetrating a subterranean formation in a drilling operation.

In one embodiment, the present invention provides a downhole tool comprising: at least one surface of the downhole tool; a layer of hardfacing formed from a weld deposit on the surface of the downhole tool, the weld deposit being applied by an internal coarse particle injection plasma transferred arc torch nozzle, the weld deposit further having a plurality of coarse hard-metal particles hard-metal and a matrix dispersed within the weld deposit; wherein at least one of the coarse hard-metal particles have a size range of about 2000 microns to about 250 microns (10 mesh to 60 mesh). In further embodiments, the weld deposit has a plurality of fine hard-metal particles, the fine hard-metal particles have a size range of about 250 microns to about 10 microns (60 mesh to 1250 mesh).

In one embodiment, the present invention provides a method comprising: providing a downhole tool that comprises a surface that has a hardfacing, the hardfacing being formed by an internal coarse particle injection plasma transferred arc torch nozzle that comprises: a heat-resistant nozzle body; at least one coarse hard-metal particle internal injection port; at least one fine hard-metal particle and matrix internal injection port; at least one gas port; and a cathode; and placing the downhole tool in a subterranean formation.

In some embodiments, the course hard-metal particle internal injection nozzles of the present invention may be used to hardface tools that are useful in industries outside oil and gas exploration and production. The applications for which the coarse hard-metal particle internal injection nozzles of the present inventions may be useful are referred to herein as "abrasive applications."

Such abrasive applications may include trenchers, front end loaders, bulldozers, and other equipment that contacts the earth and needs hardfacing to increase wear protection for the equipment.

Other abrasive applications include equipment that benefits from hardfacing in the mining industry. Equipment used in the mining industry is subject to erosion, friction, and abrasion. Thus, the apparatus, methods, and compositions of the present invention may be useful to hardface equipment used in such mining applications.

Other abrasive applications include equipment that benefits from hardfacing in a cement plant from the quarry to the ready mix blenders. Examples include, but are not limited to, roller presses, kiln tires, hammer crushers, fan blades, fan housings, buckets, drag chain beds, clinker breaker disks, raw mill fans, and the like.

Other abrasive applications include equipment that benefits from hardfacing in the waste and recycling industry. This equipment includes that which is involved in waste incineration, tire shredding, glass recycling, and construction debris elimination, shredders, such as, feeding hoppers, crushers, screws, hammers, conveyor beds, transport belts, knives, and the like.

Other abrasive applications include equipment that benefits from hardfacing in the power generation industry. This equipment includes that which is involved in power generation including equipment like screws, boiler nozzles, coated preheater tubes, breaker arms, conveyor beds, coal mills, water panels, ignition umbrellas, and the like.

Other abrasive applications include equipment that benefits from hardfacing in the steel industry. This equipment includes that which is involved in steel production from blast furnace through a finished product. Examples of the types of equipment include cooling roller trains, pumps, run-out table rollers, rolling mills, rolling cones, manipulator jaws, hot shear blades, mandrel shafts, guide rollers, sinter crushers, and the like.

To facilitate a better understanding of the present invention, the following examples of representative preferred embodiments are given. In no way should the following examples be read to limit, or to define, the scope of the invention.

EXAMPLES

A test was run to compare a hardfacing made with a manual process and a hardfacing made with an automated external injection method to illustrate that automated systems are faster than manual systems. Table 1 describes the processes used.

TABLE 1

| Process | Production Part | Application Speed |
|---|---|---|
| Automated | 8.5 four bladed sleeve | 1 hr 36 minutes |
| Manual, oxy-acetylene | 8.5 four bladed sleeve | 4 hrs 16 minutes |

Wear tests were performed according to ASTM test method B611. The results are in Table 2 below.

TABLE 2

Wear Test Comparison

| Technique | Final Wear No. (krev/cm$^3$) |
|---|---|
| Manual - Sample 1 | 5.78 |
| Manual - Sample 2 | 5.71 |
| Manual - Sample 3 | 5.42 |
| Manual - Sample 4 | 5.25 |
| Manual - Sample 5 | 5.71 |
| Average | 5.57 |
| Automated - Sample 1 | 5.71 |
| Automated - Sample 2 | 5.18 |
| Automated - Sample 3 | 6.14 |
| Automated - Sample 4 | 4.66 |
| Average | 5.42 |

From this test, it is believed that the actual hardfacing application time is over 2½ times faster for the automated procedure. The preheat temperature is half (350° F. vs. 700° F.); thus the preheat time per part is half. It may be possible to change from open flame preheating to kiln or coil preheating to reduce the preheat time even more.

It is also believed that the hardfacing reinforcement can be constantly held to about 0.030" over finish grind on all gage pads. This could save thousands of dollars on rework cost caused from hardfacing deposits being too low or too high. Savings may also be achieved through avoidance of diamond grindwheel cost.

Additionally, it is believed that the milling operation for the weld grooves can be eliminated because the thickness of the hardfacing deposit can be programmed to a constant height and again within 0.030" of the finish dimension.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. An internal coarse particle injection plasma transferred arc torch nozzle comprising:
   a heat-resistant nozzle body;
   at least one coarse hard-metal particle internal injection port;
   at least one fine hard-metal particle and matrix internal injection port;
   at least one gas port; and
   a cathode.

2. The internal coarse particle injection plasma transferred arc torch nozzle of claim 1 further comprising an element selected from the group consisting of: a cathode holding device, a plasma gas, a shielding gas, a coarse particle and fine particle feeding gas, a cooling system, a nozzle cooling system, and a combination thereof.

3. The internal coarse particle injection plasma transferred arc torch nozzle of claim 1 wherein the heat-resistant nozzle body comprises an element selected from the group consisting of: copper, titanium, and any combination thereof.

4. A system for hardfacing a downhole tool comprising:
   a plasma transfer arc nozzle that comprises:
      a heat-resistant nozzle body,
      at least one coarse particle internal injection port,
      at least one fine hard-metal particle and matrix internal injection port,
      at least one gas port, and
      a cathode; and
   a coarse hard-metal particle hopper;
   a fine hard-metal particle and matrix hopper;
   a robotic arm;
   a manipulatable substrate support table;
   a power supply; and
   a computer control system.

5. The system for hardfacing a downhole tool of claim 4 further comprising an element selected from the group consisting of: a cathode holding device, a plasma gas, a shielding gas, a coarse particle and fine particle feeding gas, a cooling system, a nozzle cooling system, and a combination thereof.

6. The system for hardfacing a downhole tool of claim 4 wherein the computer control system is a CAM system.

7. A downhole tool comprising:
   at least one surface of the downhole tool;
   a layer of hardfacing formed from a weld deposit on the surface of the downhole tool, the weld deposit being applied by the combined flow from an internal coarse particle injection plasma transferred arc torch nozzle and a fine hard-metal particle and matrix internal injection port,
      the weld deposit further having a plurality of coarse hard-metal particles and a matrix dispersed within the weld deposit;
   wherein at least one of the coarse hard-metal particles has a size range of about 2000 microns to about 250 microns (10 mesh to 60 mesh).

8. The downhole tool system of claim 7 wherein the weld deposit has a plurality of fine hard-metal particles, the fine hard-metal particles have a size range of about 250 microns to about 10 microns (60 mesh to 1250 mesh).

9. The downhole tool of claim 8 wherein at least one of the coarse hard-metal particles and/or at least one of the fine hard-metal particles comprise an element selected from the group consisting of: a metal boride, a metal carbide, a metal oxide, a metal nitride, and a combination thereof.

10. The downhole tool of claim 8 wherein at least one of the coarse hard-metal particles and/or at least one of the fine hard-metal particles comprise an element selected from the group consisting of: tungsten, a cast tungsten carbide, a carburized tungsten carbide, a macro-crystalline tungsten carbide, a cemented tungsten carbide, a tungsten nitride, a tungsten silicide, a tungsten boride, and a combination thereof.

11. The downhole tool of claim 8 wherein at least one of the coarse hard-metal particles and/or at least one of the fine hard-metal particles comprise an element selected from the group consisting of: carbon, niobium, vanadium, molybdenum, silicon, titanium, tantalum, yttrium, zirconium, chromium, boron, borides thereof, carbides thereof, nitrides thereof, silicides thereof, and a combination thereof.

12. The downhole tool of claim 7 wherein at least one of the coarse hard-metal particles is formed in part by binding material ranging between about three percent (3%) and about five percent (5%) of the total weight of each large hard-metal particle.

13. The downhole tool of claim 7 wherein the matrix comprises one selected from the group consisting of: chromium, iron, silicon, boron, carbon, cobalt, nickel, and a combination thereof.

14. A method of hardfacing a surface of a downhole tool, the method comprising:
   placing a weld deposit on the surface of the downhole tool with a robotic hardfacing system comprising an internal coarse particle injection plasma transferred arc torch nozzle that comprises:
      a heat-resistant nozzle body;
      at least one coarse hard-metal particle internal injection port;
      at least one fine hard-metal particle and matrix internal injection port;
      at least one gas port; and
      a cathode; and
   the weld deposit comprising a uniform distribution of large carbide particles.

15. The method of claim 14 further comprising placing the downhole tool in a subterranean formation via a well bore penetrating the subterranean formation.

16. The method of claim 14 wherein the internal coarse particle injection plasma transferred arc torch nozzle further comprises an element selected from the group consisting of: a cathode holding device, a plasma gas, a shielding gas, a coarse particle and fine particle feeding gas, a cooling system, a nozzle cooling system, and a combination thereof.

17. The method of claim 14 wherein the robotic hardfacing system comprises a computer control system.

18. A method comprising:
   providing a tool that comprises a surface that has a hardfacing, the hardfacing being formed by an internal coarse particle injection plasma transferred arc torch nozzle that comprises:
      a heat-resistant nozzle body;
      at least one coarse hard-metal particle internal injection port;
      at least one fine hard-metal particle and matrix internal injection port;
      at least one gas port; and
      a cathode; and
   using the tool in an abrasive application.

19. The method of claim 18 wherein the abrasive application includes a drilling operation, a drill-in operation, a completion operation, or a remedial operation.

20. The method of claim 18 wherein the abrasive application is a mining application, a cement application, a quarry application, a waste application, a recycling application, a power generation application, or a steel application.

* * * * *